United States Patent

Nakai et al.

[11] Patent Number: 5,170,199
[45] Date of Patent: Dec. 8, 1992

[54] LENS-FITTED PHOTOGRAPHIC FILM UNIT

[75] Inventors: Norihiro Nakai; Tatsuya Mochizuki; Takashi Sugimoto; Yasuhiro Yamashina; Toshiyuki Ogura, all of Kanagawa, Japan

[73] Assignee: Fuji Photo Film Co., Ltd., Kanagawa, Japan

[21] Appl. No.: 727,243

[22] Filed: Jul. 9, 1991

[30] Foreign Application Priority Data

Jul. 9, 1990 [JP] Japan .......................... 2-180994
Aug. 7, 1990 [JP] Japan .......................... 2-83580

[51] Int. Cl.$^5$ .............................................. G03B 15/02
[52] U.S. Cl. ..................................... 354/126; 354/147; 354/288
[58] Field of Search ................ 354/126, 288, 129, 147

[56] References Cited

U.S. PATENT DOCUMENTS

| | | | |
|---|---|---|---|
| 3,896,467 | 7/1975 | Hamada | 354/204 |
| 4,803,504 | 2/1988 | Maeno et al. | 354/64 |
| 4,882,600 | 11/1989 | Van de Moere | 354/64 |
| 4,954,858 | 9/1990 | Ohmura et al. | 354/288 |

FOREIGN PATENT DOCUMENTS 3905310 8/1989 Fed. Rep. of Germany .
64-544 1/1989 Japan .
1494866 12/1977 United Kingdom .

Primary Examiner—Michael L. Gellner
Assistant Examiner—David M. Gray
Attorney, Agent, or Firm—Young & Thompson

[57] ABSTRACT

A main body of a lens-fitted photographic film unit is provided with a film wind-up mechanism, a taking lens and a shutter mechanism. The main body with an unexposed film incorporated is covered by a front cover and a rear cover, which are directly attached to each other by arresting claws in holes formed thereon. The main body is positioned by being held fixedly between the two covers in order to prevent the main body from being damaged when the two covers are removed. In a preferred embodiment, the main body is provided with an electronic flash device, which is operated in synchronism with a shutter blade by use of an X contact. A pair of terminals of metal plates extend toward, and are in contact with, a printed circuit board which is removably supported on the main body by cooperation of supporting members and a supporting plate, both of which are formed outside a light-shielding tube of the main body. In this way, neither the main body nor the circuit board will be damaged when the unit is broken open to retrieve and process the exposed film; and so the undamaged parts can be reused.

25 Claims, 8 Drawing Sheets

F I G. 5
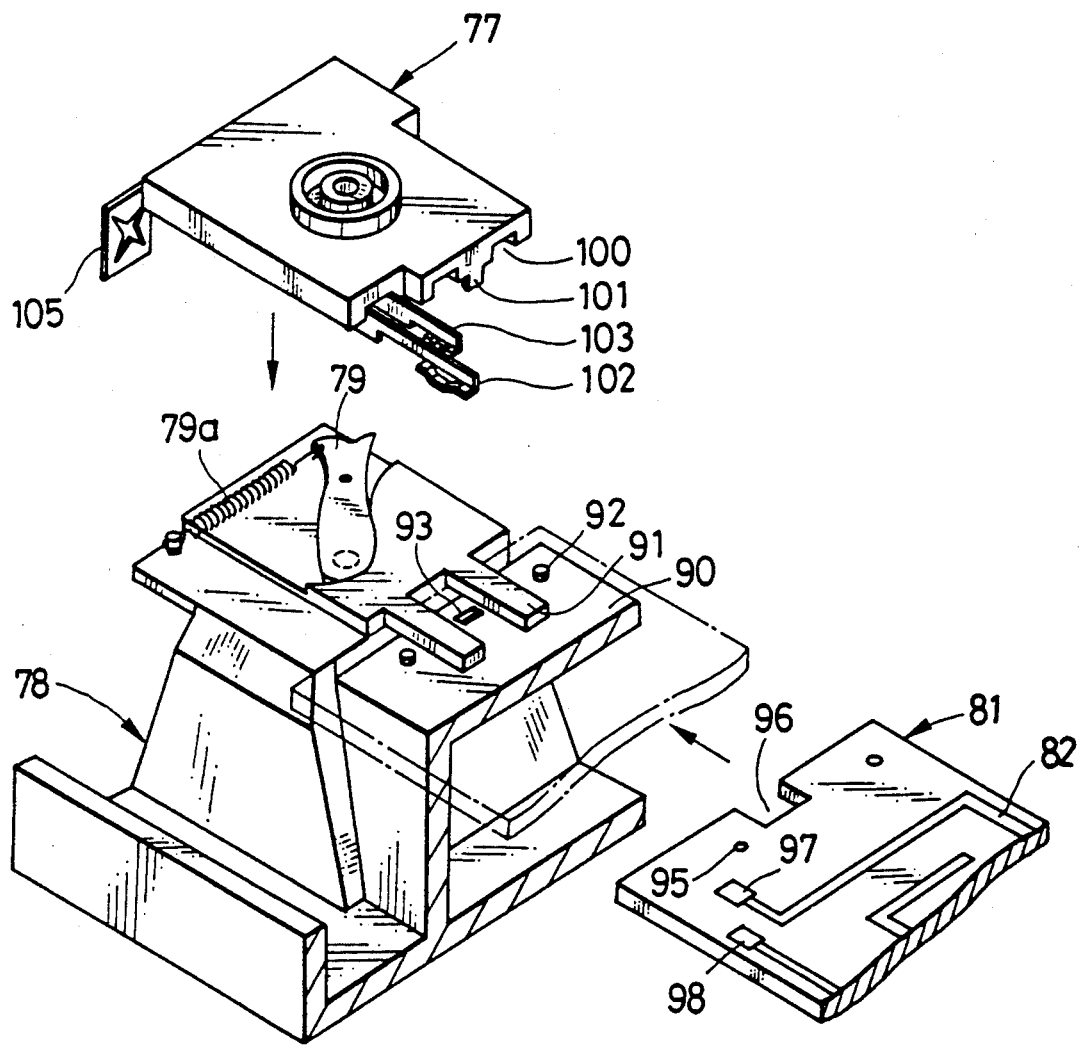

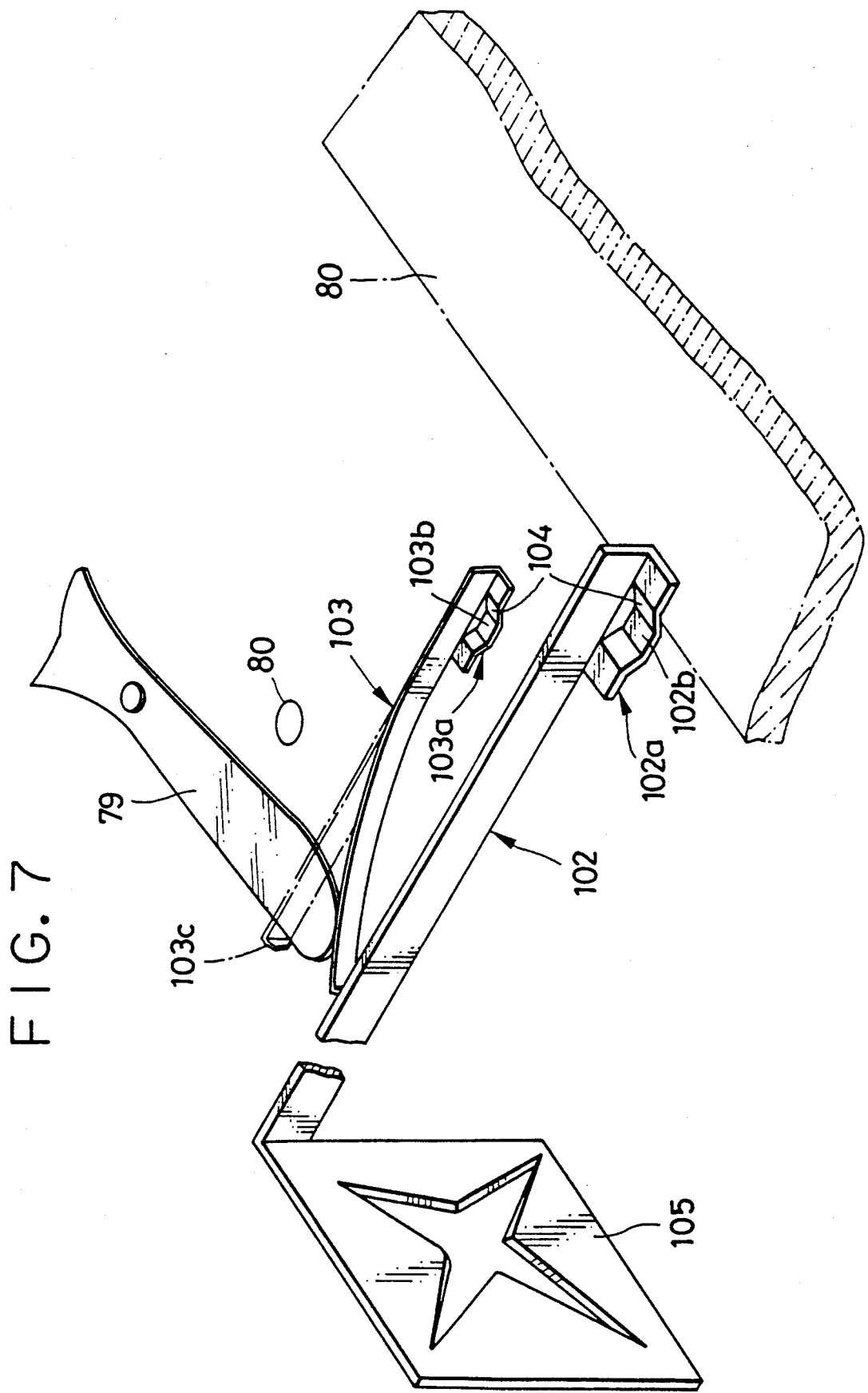

LENS-FITTED PHOTOGRAPHIC FILM UNIT

BACKGROUND OF THE INVENTION

1. Field of the Invention

The present invention relates to a lens-fitted photographic film unit having a photograph-taking function, more particularly to a lens-fitted film unit of which an incorporated component is easily removed at the time of disassembly.

2. Description of Related Art

Lens-fitted photographic film units are sold at a low cost, comparable to a conventional film, and are available wherever ordinary photographic films are sold. It is easy to buy a lens-fitted photographic film unit and to take photographs without a camera, if one has brought no camera along but wants to take photographs. Such a film unit is illustrated in FIG. 9 and has a main body 13 which is attached to a front cover 15 and a rear cover 16, in which a taking lens 5, a film advancing knob 9 of a film wind-up mechanism and a shutter mechanism 12 are incorporated, and which contains in a light-tight fashion a 135-type photographic film in a cassette as defined by ISO code 1007, 1979 version. The two covers 15 and 16 are provided with claws 23 and holes 25 which are coupled respectively with holes 21 and claws 19. The detention of the claws 19 and 23 in the holes 21 and 25 prevents the main body 13 from being detached from the main body 13.

The main body 13 is provided with a film supplying chamber 28 and a film take-up chamber 29 formed on opposite lateral sides of the taking lens 5. An unexposed film 30 is wound in a roll and contained in the film supplying chamber 28. A user who has purchased the film unit winds up the film 30 frame by frame at each exposure on a spool 31 in a cassette body 32 loaded in the film take-up chamber 29, and forwards the film unit in its entirety to a photo laboratory when the whole strip of the film is exposed. An operator at the laboratory unloads the cassette body 32 containing the exposed film 30 from the film unit and subjects it to development and printing in accordance with conventional photographic processing techniques.

The user receives photoprints and a negative film but does not receive the film housing of the film unit. The film housing after processing has heretofore been destroyed and discarded as a waste product. However, problems arise from the increase in waste products and the destruction of the environment caused thereby, so that it is desirable to be able to reuse the film housing after processing.

But the known front and rear covers 15 and 16 have a construction inappropriate for reuse because they can accumulate deposits of dirt during the use of the film unit. Moreover, the claws and holes are fragile and can be damaged when disassembling the film housing. On the other hand, the main body 13 is usually free from dirt deposits or damage because it is protected by the two covers 15 and 16. It would therefore be highly advantageous, if possible, to save and reuse the main body 13 with the taking lens 5, the film wind-up mechanism and the shutter mechanism 12.

There are also lens-fitted photographic film units with an electronic flash device incorporated therein. The electronic flash device is also produced at a low cost in order to keep the film units inexpensive. Its construction is improved for this purpose by supporting a light emitting section directly on a printed-circuit board constituting an electronic flash circuit, and by soldering an X contact or synchro switch to the printed-circuit board, which X contact actuates the electronic flash device to flash in synchronism with the time of full opening of a shutter blade mounted on the film housing. Although such electronic flash devices have heretofore been discarded along with the film housing after processing in the laboratory, it is also desirable to reuse the flash unit.

As indicated above, the claws 19 and the holes 21 of the main body 13 attached to the front and rear covers 15 and 16 can be damaged in disassembly, e.g. by use of a jig. Such a damaged main body 13 will be only loosely attached to newly provided front and rear covers, and there can be difficulty in assembling a new film unit because of deformation of the claws 19 and the holes 21.

In the electronic flash device assembled by use of soldering, there is a problem of liability of incomplete flashing caused by an incomplete soldering of the X contact to the printed circuit board. Prevention of the incomplete emission necessitates a secure fixation by applying excess solder. However, an excessively secure fixation of the X contact on the printed circuit board requires considerable labor in removing the electronic flash device from the film housing for the purpose of reusing the electronic flash device.

OBJECT OF THE INVENTION

It is therefore an object of the present invention to provide a lens-fitted photographic film unit from which an incorporated component to be reused can be easily removed without damage.

SUMMARY OF THE INVENTION

In order to achieve the above and other objects and advantages of this invention, a lens-fitted photographic film unit according to the present invention comprises a main body provided with the film wind-up mechanism, the taking lens and the shutter, having unexposed photographic film previously loaded therein; a front cover arranged in front of the main body; and a rear cover arranged behind the main body and coupled with the front cover so as fixedly to hold the main body therebetween. It is thus possible to remove the main body without damage when disassembling the film unit.

In accordance with a preferred embodiment, a flash circuit board of a flash device causes a flash tube to emit light at the time of taking a photograph. A pair of contacts are provided on a surface of the flash circuit board. A pair of elongated metal contact plates are disposed side by side, supported on the photo-taking device section, one pair of ends of the respective contact plates serving as an X contact to be switched on/off in accordance with operation of the shutter mechanism, an opposite pair of ends of the respective contact plates serving as terminals. Holding means hold the flash circuit board with the contacts of the flash circuit board in contact with the terminals of the contact plates when the flash circuit board is removably inserted in the photo-taking device section. Thus the flash device can also be removed without damage.

BRIEF DESCRIPTION OF THE DRAWINGS

The above and other features and advantages of the present invention will become more apparent from the following detailed description when read in connection with the accompanying drawings, in which:

FIG. 5 is an exploded perspective view illustrating an important portion of the lens-fitted film unit illustrated in FIG. 4;

FIG. 7 is a perspective view illustrating an X contact used in the lens-fitted film unit illustrated in FIG. 4;

DETAILED DESCRIPTION OF THE PREFERRED EMBODIMENTS

Figure 1:
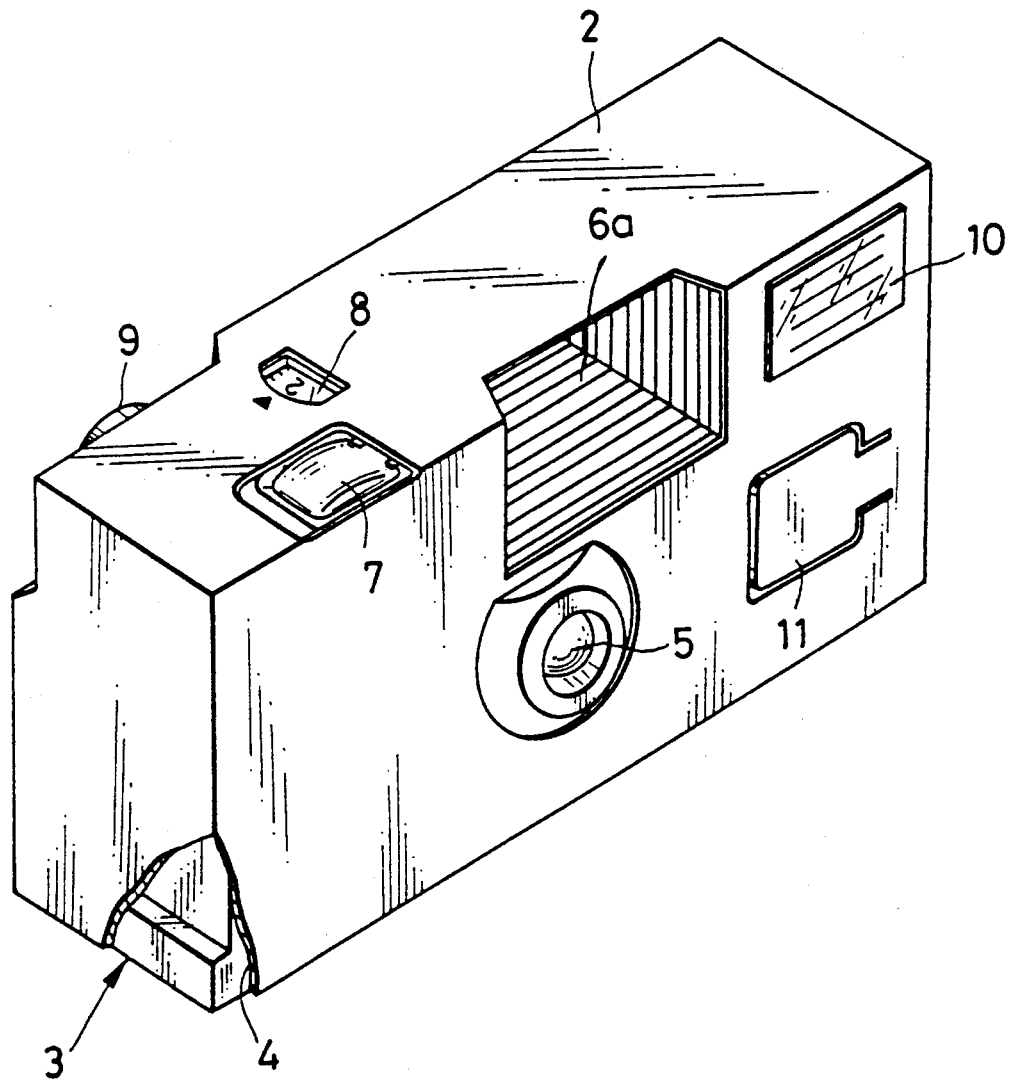
FIG. 1 is a perspective view illustrating a lens-fitted photographic film unit according to the present invention.

Referring to FIG. 1, a lens-fitted film unit 2 consists of a film housing 3 having a photograph-taking mechanism and an external casing 4 containing the film housing 3. Photographs are taken with the film housing 3 contained in the external casing 4. The external casing 4 is provided so that the lens-fitted film unit 2 has an attractive appearance, and is for example a paper box with the exterior surface printed. The external casing 4 has openings for exposing a taking lens 5, an object-side finder window 6a, an eye-side finder window 6b (see FIG. 2), a shutter release button 7, a film counter 8, a film advancing knob 9 and a light emitting section 10 containing a flash tube, and a cutting 11 that can be pushed to operate a flash switch (not shown).

Figure 2:
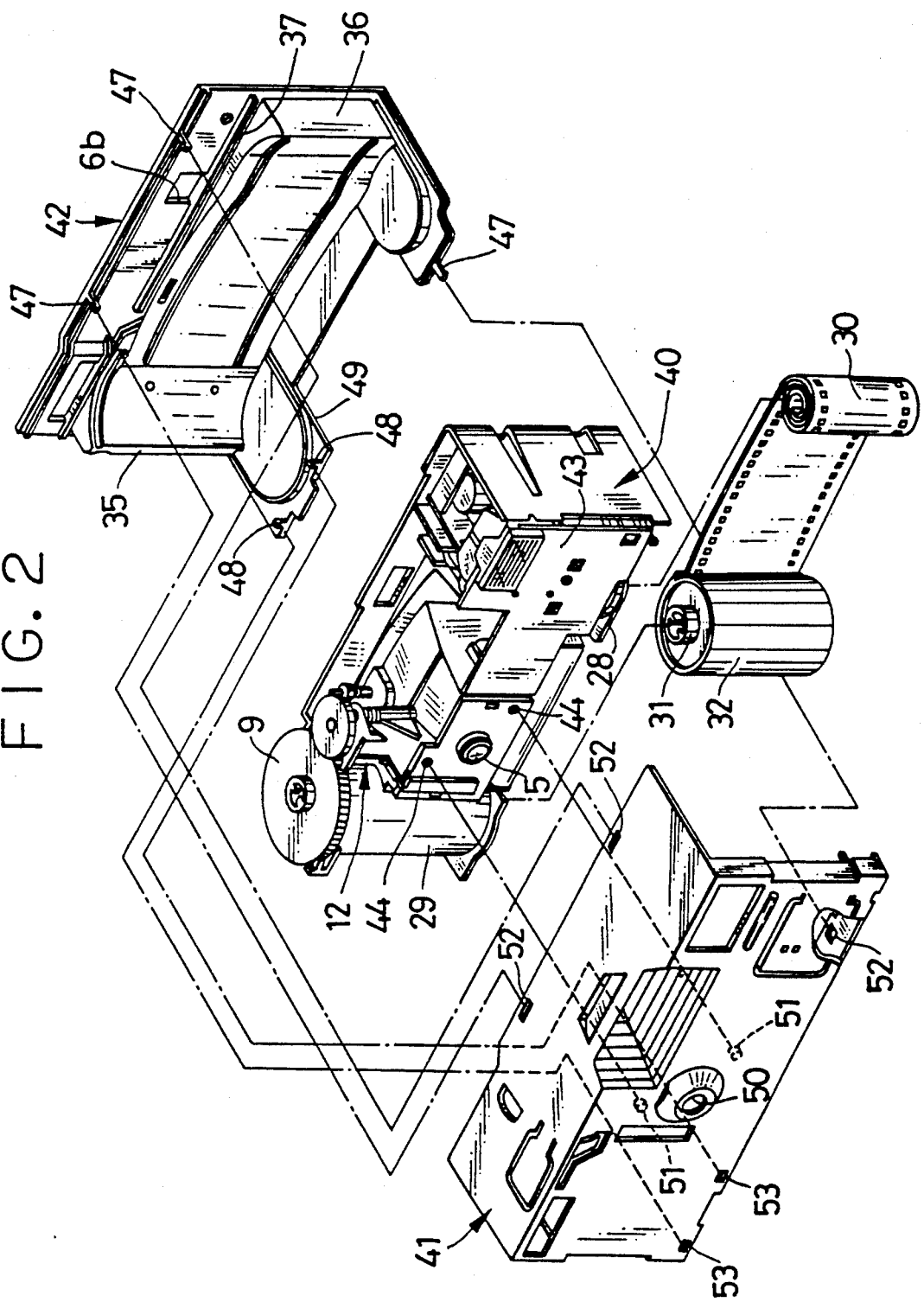
FIG. 2 is an exploded perspective view illustrating the lens-fitted film unit illustrated in FIG. 1.

As illustrated in FIG. 2, the film housing 2 comprises a main body 40, a front cover 41 to be arranged in front thereof, and a rear cover 42 to be arranged behind the main body 40 after loading photographic film. The main body 40, the front cover 41 and the rear cover 42 are each a one-piece plastic molding. The main body 40 is provided with mechanisms necessary for taking a photograph, i.e. the taking lens 5, the film counter 8, a shutter mechanism 12, a film wind-up mechanism and an electronic flash device 43. Holes 44 are provided in the front side of the main body 40 for positioning it with respect to the front cover 41. The main body 40 is provided with a film take-up chamber 29 for containing a cassette body 32 of a 35-mm film cassette, a film supply chamber 28 for containing a roll of unexposed film 30, e.g. negative film, and an exposure station defined between the two chambers 28 and 29. It is to be noted that a rotatable spool (not shown) may be provided in the film supplying chamber 28, and that the roll of film 30 may be wound around it.

The unexposed film 30 is contained in the cassette body 32 with a film trailer attached to a spool 31 of the cassette. After the cassette is loaded into the main body 40, the unexposed film 30 is drawn out of the cassette body 32 and wound in a roll.

A plurality of arresting claws 47 and 48 are formed on the rear cover 42 on the top and the bottom for attaching the rear cover 42 to the front cover 41. A bottom surface 49 provided with the arresting claws 48 is in the shape of a lid which is downwardly openable so as to unload the cassette therefrom after completing exposure. Reference numerals 35 and 36 designate projections that rearwardly close the chambers 28 and 29 and help to position the main body 40 on the rear cover 42. A groove 37 is formed around the projections 35 and 36 to be fitted on a ridge (not shown) formed on the rear of the main body 40. The groove 37 with the ridge fitted therein forms a labyrinth seal to shield the two chambers 28 and 29 from light.

An opening 50 is formed on the front cover 41 through which the taking lens 5 is exposed to the field of view. The rear surface of the front cover 41 around the opening 50 is provided with pins 51 to be fitted in the holes 44 of the main body 40. Arresting holes 52 and 53 are formed on the rear cover 41 on the top and the bottom in the positions corresponding to the arresting claws 47 and 48 formed on the rear cover 42. The locking engagement between the claws 47 and 48 and the holes 52 and 53 causes the front and rear covers 41 and 42 to hold the main body 40 fixedly therebetween.

The process of assembling the lens-fitted film unit as constructed above will now be described. After mounting the above-described mechanisms on the main body 40 and loading the film 30 in the cassette body 32 therein, the rear surface of the main body 40 is fitted onto the front surface of the rear cover 42. When the pins 51 of the front cover 41 are inserted in the holes 44 of the main body 40, the main body 40 is fitted on the front cover 41. The claws 47 and 48 engage lockingly in the holes 52 and 53 so as to attach the front cover 41 to the rear cover 42 with the main body 40 fixedly held therebetween.

Of course, assembly of the film unit is performed in a darkroom, in which the unexposed film is drawn from cassette body 32 and formed into roll 30 and then assembled within the film unit as described above.

After all the film has been exposed, the main body 40 can be removed by disengaging the claws 47 and 48 without damaging the main body 40 when the used film cassette submitted to a laboratory is disassembled by applying a tool or a jig. In order to disengage the claws 47 and 48 with ease, it is possible to provide slits around the claws for making it easy to deform the claws in the disengaging direction. It is not necessary to perform disassembly in a darkroom, as all the film has by then been rewound into cassette body 32.

Figure 3:
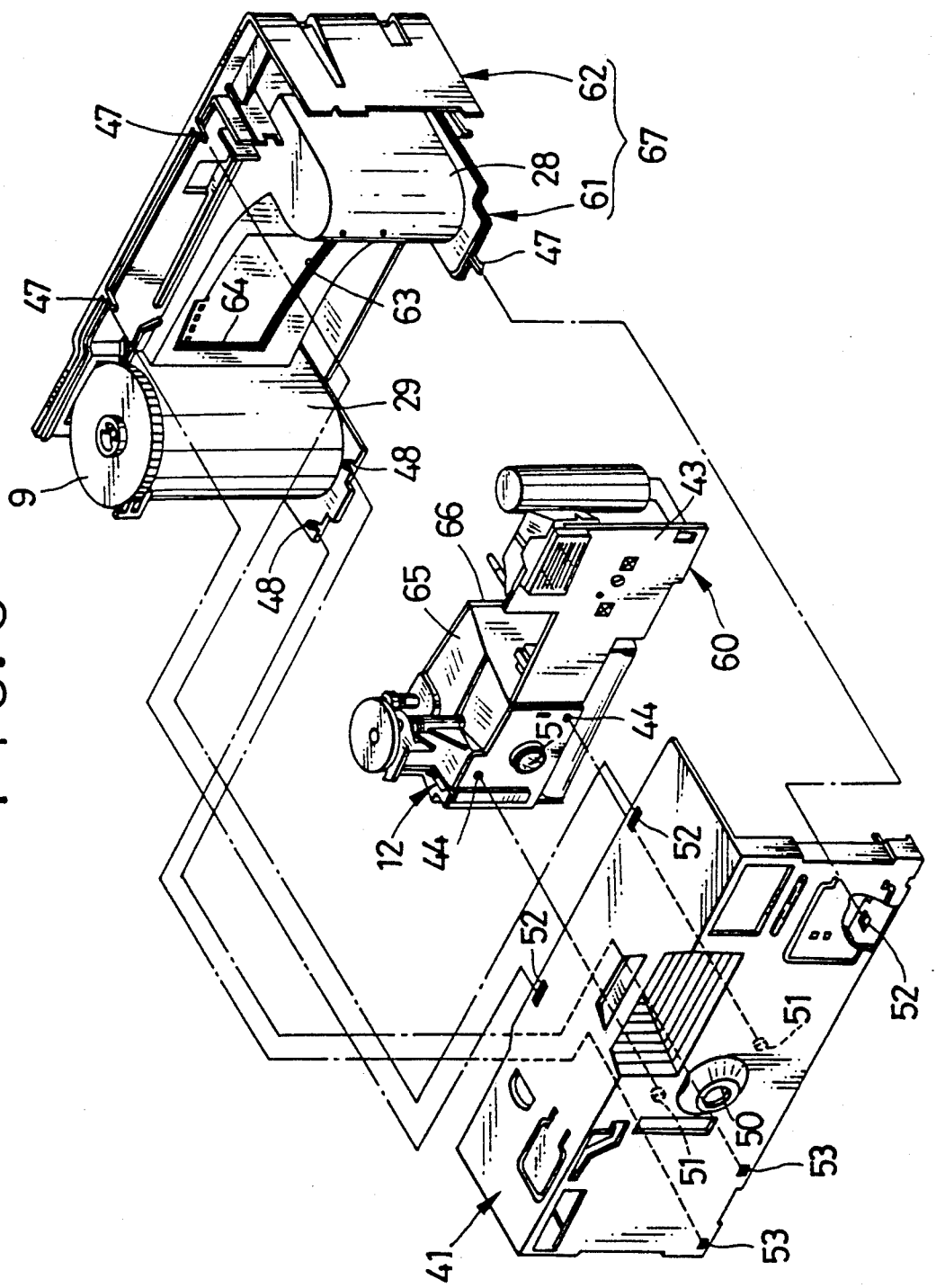
FIG. 3 is an exploded perspective view illustrating a lens-fitted film unit according to another preferred embodiment.

Another preferred embodiment of the inventive lens-fitted film unit will now be described referring to FIG. 3. A rear cover 62 is attached to a film holder 61 including the two chambers 28 and 29, whereas a light-shielding tube 65 or exposure tunnel 65 is incorporated in a photo-taking device section 60, which is provided with the taking lens 5, the shutter mechanism 12 and the electronic flash device 43. A film containing unit 67 has the film holder 61 fixed on the rear cover 62 either by adhesion or by locking engagement between claws and holes, and contains the unexposed film 30 therein, and includes the film advancing knob 9 on the top of the film take-up chamber 29. An exposure station 63 is formed between the two chambers 28 and 29, and is provided with a peripheral groove 64 around it to be fitted onto a rear peripheral edge 66 defined by the light-shielding tube 65.

Insertion of the rear edge 66 into the peripheral groove 64 positions the film containing unit 67 on the photo-taking device section 60, whereby the inside of the exposure station 63 is shield from light.

After positioning the film containing unit 67 on the photo-taking device section 60, the front cover 61 is positioned on the photo-taking device section 60 by inserting the pins 51 in the holes 44 in a manner similar to the embodiment illustrated in FIG. 2. The claws 47 and 48 formed on the rear cover 62 lockingly engage in the holes 52 and 53 formed on the front cover 41 to complete the assembly of the film housing 2.

Figure 4:
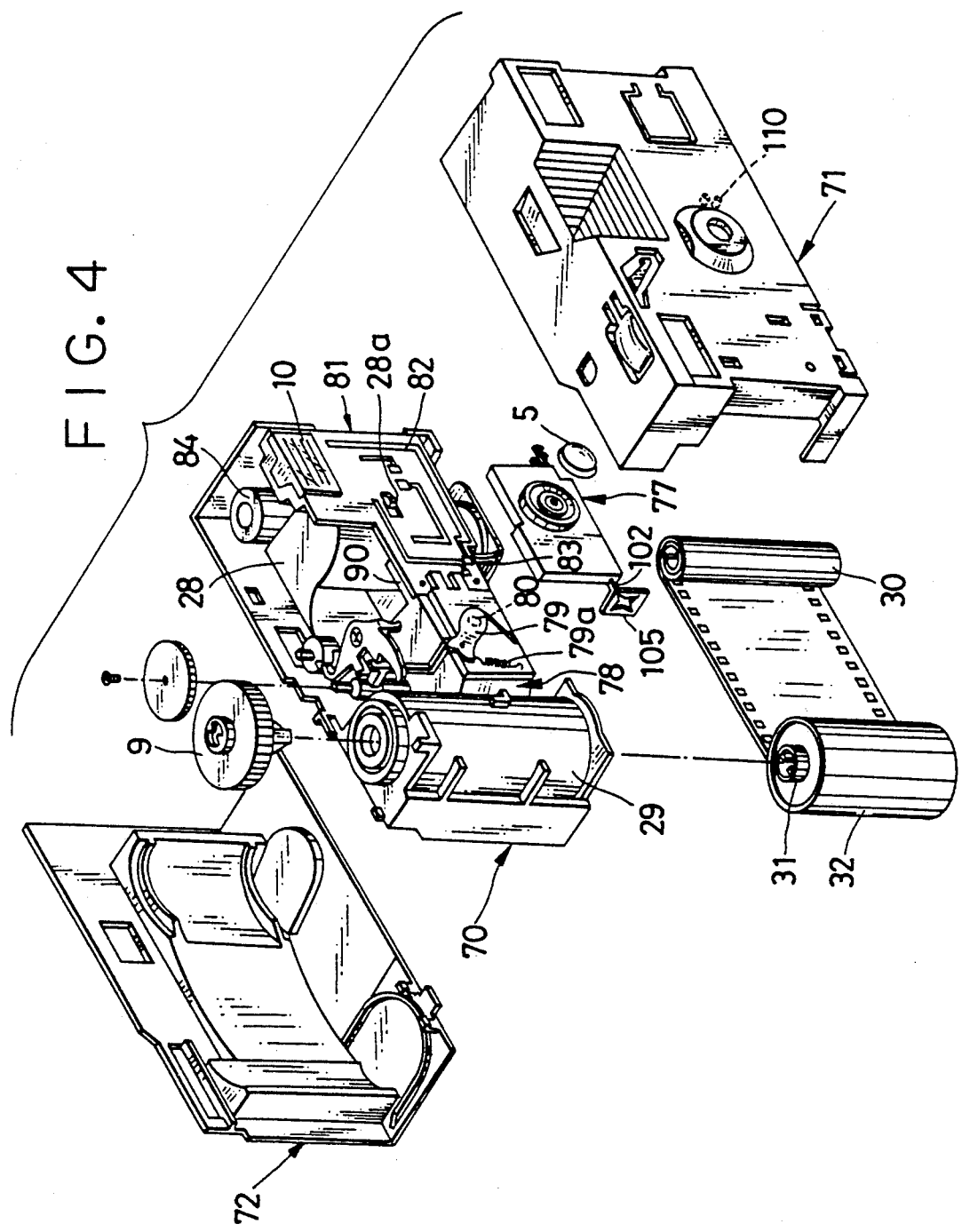
FIG. 4 is an exploded perspective view illustrating a lens-fitted film unit according to still another preferred embodiment.

Although the above-described lens-fitted film unit has a photo-taking device section having a photo-taking function, which is easily removable, it is possible to construct a film unit having an electronic flash device which is easily removable by making an improvement in the attachment of an electronic flash circuit to an X contact. In FIG. 4, illustrating such a film unit, the film housing 2 consists of a main body 70, a front cover 71 and a rear cover 72 both attached to the main body 70 by the use of claws, which covers are each of molded one-piece opaque plastic construction. The front side of the film supplying chamber 28 is provided with an arresting claw 28a for supporting a printed circuit board to be described later.

A lens board 77 for holding the taking lens 5 is mounted on a light-shielding tube 78, which is formed between the two chambers 28 and 29. A shutter blade 79 is provided on the front side of the light-shielding tube 78, biassed by a spring 79a, and covers an opening 80, indicated by a broken line, except during exposure. A printed circuit board 81 holding the light-emitting section 10 is mounted to the right of the light-shielding tube 78. A circuit pattern 82 is printed on the front surface of the printed circuit board 81, to whose rear surface there are connected a terminal 83 for contact with a negative terminal of a battery and a capacitor 84. The circuit pattern 82 together with the capacitor 84 constitutes the electronic flash circuit 43.

Referring to FIG. 5 illustrating an enlargement of an important portion of the light-shielding tube 78 of FIG. 4, its lateral side is provided with a supporting plate 90 and a pair of supporting members 91 integrally formed therewith for supporting the printed circuit board 81. The supporting plate 90 and the supporting members 91 defined a thin space therebetween in which the printed circuit board 81 is inserted in the direction indicated by the arrow. The supporting plate 90 is provided with a pair of projections 92 for positioning the printed circuit board 81 and an arresting hole 93 for positioning and supporting the lens board 77 on the light-shield tube 78 by arresting a claw 101 of the lens board 77 to be described later. It is to be noted that the projections 92 may be formed on the back surface of the supporting members 91 instead of on the supporting plate 90. The construction for supporting the printed circuit board 81 is not to be limited by the description herein, on which variations may be made.

There are formed on printed circuit board 81 a pair of holes 95 to receive the projections 92 and a recess 96 to expose the arresting hole 93 on the printed circuit board 81. The circuit pattern 82 has lands 97 and 98 to be connected to the X contact.

Figure 6:
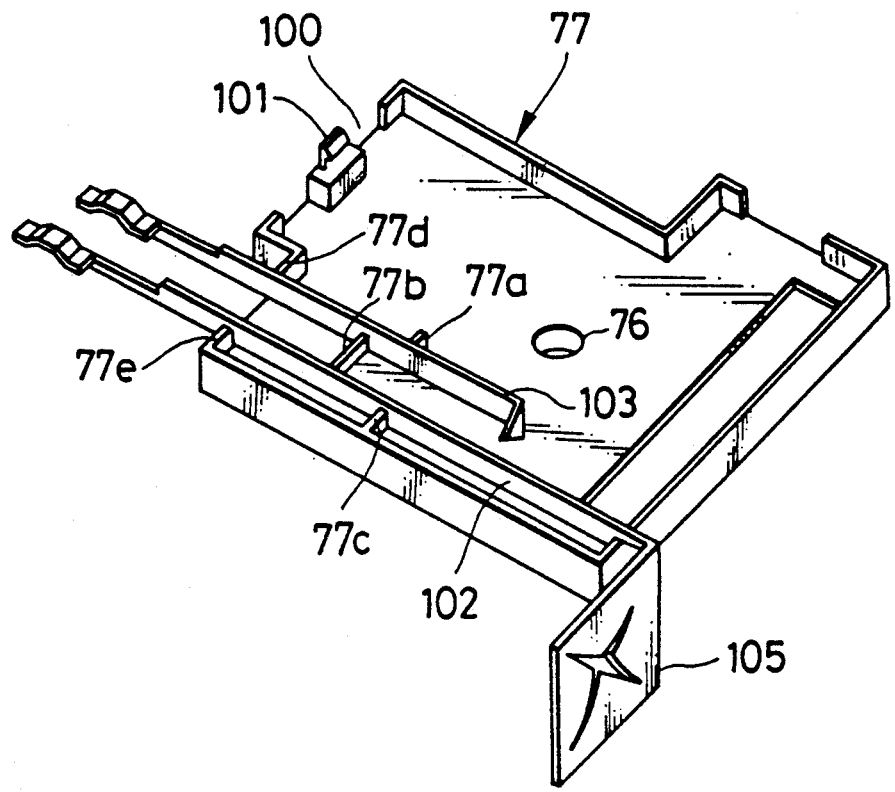
FIG. 6 is a perspective view illustrating a lens board illustrated in FIG. 4, observed from behind.

As illustrated in FIG. 6, the lens board 77 is provided with a pair of recesses 100 and the arresting claw 101 formed thereon. The recesses 100 are adapted to be fitted on the supporting members 91 to position the lens board 77. A pair of metal plates 102 and 103 constituting the above X contact are mounted on the lens board 77.

Five ridges 77a to 77e are formed on the lens board 77. The ridges 77b, 77c and 77e are in contact with the metal plate 102 whereas the ridges 77a, 77b and 77d are in contact with the metal plate 103, which metal plates are kept in parallel thereby. A reference numeral 76 designates an opening for the passage of light from the taking lens 5.

Ends of the metal plates 102 and 103 are bent in the shape of a letter L along the lengthwise direction, and form contact portions 102a and 103a adapted to contact the lands 97 and 98 as illustrated in FIG. 7. The middles 102b and 103b of the contact portions 102a and 103a project downward as compared with both ends of the contact portions 102a and 103a, and are so disposed as to be lower than the upper surface of the printed circuit board 81. Inclined surfaces 104 are connected to the middles 102b and 103b. When the printed circuit board 81 is slid onto the supporting plate 90 in the direction of the arrow in FIG. 5, the advancing edge of the printed circuit board 81 is in contact with the inclined surfaces 104 and advances to the position under the contact portions 102a and 103a wherein the latter resiliently bear against the lands 97 and 98.

The other end of the metal plate 103 is provided with a bent portion 103c, which is in contact with the metal plate 102 when the metal plate 103 is pressed by the shutter blade 79. The other end of the metal plate 102 is provided with a terminal 105 adapted to be in contact with a positive terminal of the battery.

The process of assembling the film unit as above will now be described. The main body 70 is assembled by mounting the lens board 77 with the metal plates 102 and 103 on the light-shielding tube 78, whereas the light-emitting section 10 is mounted on the printed circuit board 81. The printed circuit board 81 is mounted on the main body 70 after assembling the main body 70 and the printed circuit board 81. The printed circuit board 81 is slid onto the supporting plate 90 in the direction of the arrow so as to insert the advancing end of 81 between the supporting plate 90 and the supporting members 91. The advancing end of the printed circuit board 81 presses the contact portions 102 and 103a upward by contact with the inclined surfaces 104. Further sliding movement brings the printed circuit board 81 into contact with the projections 92. By applying a deforming force to both lateral edges, the printed circuit board 81 is curved slightly in the shape of a letter U, and inserted while maintaining this curved state until its advancing end is in contact with the light-shielding tube 78.

When the force deforming the printed circuit board 81 is relaxed, the printed circuit board 81 becomes planar so that the holes 95 are fitted onto the projections 92 with the printed circuit board 81 supported and positioned on the light-shielding tube 78. Because the lens board 77 is positioned on the light-shielding tube 78, the contact portions 102a and 103a are kept in reliable contact with the lands 97 and 98.

In order to remove the printed circuit board 81 from the film unit 2 after removing the front cover 71, both lateral edges of the printed circuit board 81 are raised, thereby deforming the board and releasing the projections 92 from the holes 95 so that the printed circuit board 81 is freed to slide toward the right in FIG. 5. This sliding of the printed circuit board 81 releases its attachment to the light-shielding tube 78 and the metal plates 102 and 103 are left on the main body 70.

Figure 8:
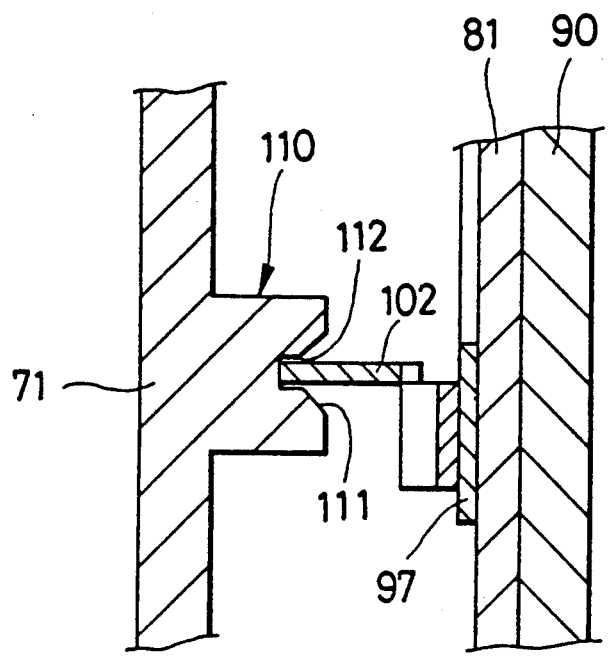
FIG. 8 is a sectional view illustrating an important portion of a lens-fitted film unit according to a further preferred embodiment.
Figure 9:
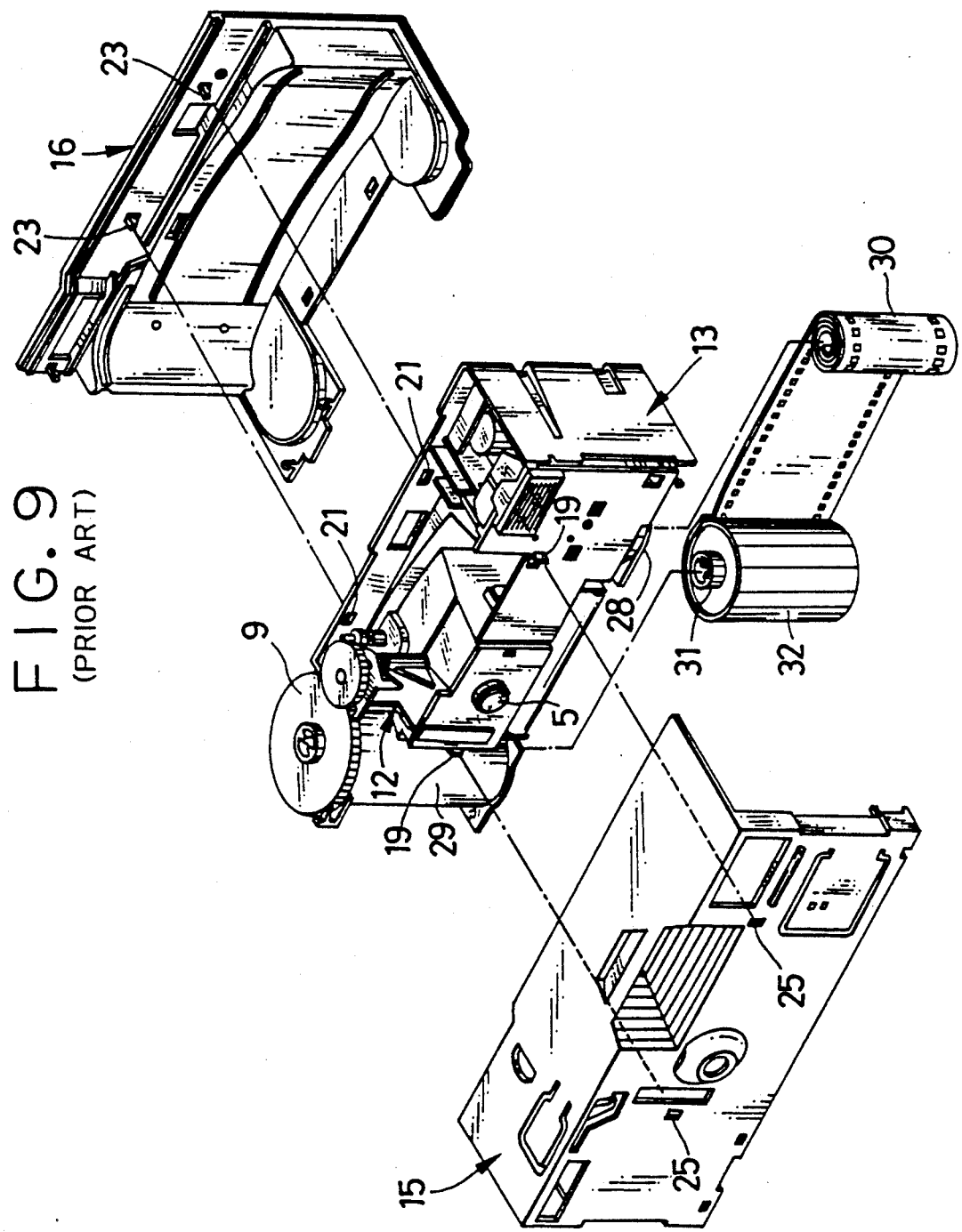
FIG. 9 is an exploded perspective view illustrating a conventional lens-fitted film unit.

FIG. 8 illustrates a further preferred embodiment in which the contact portions 102a and 103a of the X contact are pressed with additional pressure against the printed circuit board 81 so as to improve the connection of the metal plates and the electronic flash circuit. The construction illustrated in FIG. 8 presses one of the two contact portions, but it will be understood that both of the contact portions 102a and 103a are actually pressed. The printed circuit board 81 is similarly mounted on the front side of the supporting plate 90. The metal plate 102 arranged on the front side of the printed circuit board 81 is pressed by a projection 110 formed on the front cover 71, and held between the projection 110 and the land 97. The projection 110 is provided with a groove 112, which has guide surfaces 111, which correct the position of the metal plate 102 when the metal plate 102 deviates from its intended position.

When the printed circuit board 81 is mounted on both the main body 70 and the front cover 71, the top of the projection 110 is in contact with the metal plate 102. Even if the position of the metal plate 102 deviates upward or downward, it is appropriately inserted in the groove 112 with the aid of the guide surfaces 111. When the front cover 71 is attached to the main body 70 by the use of claws, the groove 112 presses the metal plate 102 to the right in FIG. 8 against the printed circuit board 81. Thus the contact portion 102a is pressed against the land 97 with a reliable contact. It is to be noted that, if the interval between the projection 110 and the printed circuit board 81 is too small as compared with the metal plate 102, the pressing force between the contact portion 102a and the land 97 can be regulated by deforming the contact portion 102a.

It is to be noted that, on the assumption that both covers are to be scrapped after use, the front cover and the rear cover may be attached together by use of ultrasonic welding instead of by arresting claws in holes, the welds being in the same positions as the claws and holes.

In the above-described embodiments, the whole strip of film is drawn out of the cassette previously in the factory, and wound back in the cassette frame by frame upon exposure. However, a lens-fitted photographic film unit according to the present invention may have such a construction as to require no cassette, or such as to contain two cassettes, one disposed in the film supplying chamber and the other in the film take-up chamber.

Although the above-described film housing in the inventive film unit consists of three components, i.e. the front cover, the rear cover and the main body, it may consist of four components including an upper cover separate from the front cover, so that each of the front and rear covers is attached to the upper cover so as to support the main body by and between the front and rear covers.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. In a lens-fitted photographic film unit having an exposure aperture and a film supplying chamber for containing an unexposed photographic film and a film take-up chamber for winding up said film when exposed, said chambers being disposed on opposite lateral sides of said exposure aperture, and which includes a taking lens, a shutter mechanism, and a film wind-up mechanism for winding said exposed film; the improvement wherein said lens-fitted film unit comprises:
 a film containing section having said exposure aperture, said film supplying chamber, said film take-up chamber and said film wind-up mechanism;
 a rear cover arranged behind said film containing section;
 a photo-taking device section having said shutter mechanism and supporting said taking lens; and
 a front cover arranged in front of said film containing section and coupled with said rear cover so as fixedly to hold said film containing section and said photo-taking device section between said two covers;
 said front and rear covers being coupled to each other but not to said film containing section, thereby to permit reuse of said film containing section and said photo-taking device section upon separation of said front and rear covers and removal of said exposed film.

2. A lens-fitted photographic film unit as defined in claim 1, wherein said photo-taking device section includes a light-shielding tube arranged between said taking lens and said exposure aperture, and said taking lens and said shutter mechanism are mounted on said light-shielding tube.

3. A lens-fitted photographic film unit as defined in claim 2, wherein said film containing section and said photo-taking device section are unified as a main body, and said rear and front covers are coupled together so as fixedly to hold said main body with said unexposed film loaded therein between said rear and front covers.

4. A lens-fitted photographic film unit as defined in claim 2, wherein said film containing section is unified as a film containing unit by attaching said rear cover behind said film containing section so as to shield a rear side of said film containing section from light after loading said unexposed film in said film containing section; and said rear and front covers are coupled together so as fixedly to hold said photo-taking device section between said film containing unit and said front cover.

5. In a lens-fitted photographic film unit having an exposure aperture and a film supplying chamber for containing an unexposed photographic film and a film take-up chamber for winding up said film when exposed, said chambers being disposed on opposite lateral sides of said exposure aperture, and which includes a taking lens, a shutter mechanism, and a film wind-up mechanism for winding said exposed film; the improvement wherein said lens-fitted film unit comprises:
 a film containing section having said exposure aperture, said film supplying chamber, said film take-up chamber and said film wind-up mechanism;
 a rear cover arranged behind said film containing section;
 a photo-taking device section having said shutter mechanism and supporting said taking lens; and
 a front cover arranged in front of said film containing section;
 said photo-taking device section including a light-shielding tube arranged between said taking lens and said exposure aperture, and said taking lens and said shutter mechanism being mounted on said light-shielding tube;

said film containing section being unified as a film containing unit by attaching said rear cover behind said film containing section so as to shield a rear side of said film containing section from light after loading said unexposed film in said film containing section; and said rear and front covers being coupled together so as fixedly to hold said photo-taking device section between said film containing unit and said front cover;

there being a groove formed on a periphery of said exposure aperture in a rectangular manner, a rear edge of said light-shielding tube of said photo-taking device section being fitted in said groove.

6. A lens-fitted photographic film unit as defined in claim 1, wherein a coupling claw is formed on one of said front and rear covers, and a coupling hole is formed on the other of said front and rear covers for interlockingly receiving said claw in said hole.

7. A lens-fitted photographic film unit as defined in claim 1, wherein a cassette having a rotatable spool is contained in said film take-up chamber, and a film roll in which said unexposed film is wound after being drawn out of said cassette is contained in said film supplying chamber.

8. In a lens-fitted photographic film unit having an exposure aperture and a film supplying chamber for containing an unexposed photographic film and a film take-up chamber for winding up said film when exposed, said chambers being disposed on opposite lateral sides of said exposure aperture, and which includes a taking lens, a shutter mechanism, and a film wind-up mechanism for winding said exposed film; the improvement wherein said lens-fitted film unit comprises:

a film containing section having said exposure aperture, said film supplying chamber, said film take-up chamber and said film wind-up mechanism;

a rear cover arranged behind said film containing section;

a photo-taking device section having said shutter mechanism and supporting said taking lens; and a front cover arranged in front of said film containing section and coupled with said rear cover so as fixedly to hold said film containing section and said photo-taking device section between said two covers;

said taking lens being mounted on a lens board, and at least two positioning pins formed on a rear side of said front cover being fitted into at least two holes formed on said lens board.

9. A lens-fitted photographic film unit as defined in claim 1, wherein said rear cover is substantially L-shaped, and includes a first portion for shielding light from behind said film supplying chamber, said film take-up chamber and said exposure aperture, and a second portion for shielding light from a bottom of said film supplying chamber and said film take-up chamber.

10. A lens-fitted photographic film unit as defined in claim 9, wherein said front cover is substantially L-shaped, and includes a third portion disposed in front of said photo-taking device section and a fourth portion disposed on top of said film containing section.

11. In a lens-fitted photographic film unit having an exposure aperture and a film supplying chamber for containing an unexposed photographic film and a film take-up chamber for winding up said film when exposed, said chambers being disposed on opposite lateral sides of said exposure aperture, and which includes a taking lens, a shutter mechanism, and a film wind-up mechanism for winding said exposed film; the improvement wherein said lens-fitted film unit comprises:

a film containing section having said exposure aperture, said film supplying chamber, said film take-up chamber and said film wind-up mechanism;

a rear cover arranged behind said film containing section;

a photo-taking device section having said shutter mechanism and supporting said taking lens; and a front cover arranged in front of said film containing section and coupled with said rear cover so as fixedly to hold said film containing section and said photo-taking device section between said two covers;

said rear cover being substantially L-shaped, and including a first portion for shielding light from behind said film supplying chamber, said film take-up chamber and said exposure aperture, and a second portion for shielding light from a bottom of said film supplying chamber and said film take-up chamber;

said front cover being substantially L-shaped, and including a third portion disposed in front of said photo-taking device section and a fourth portion disposed on top of said film containing section;

a first coupling claw being formed on top of said first portion, a second coupling claw being formed on the front of said second portion, a first coupling hole being formed on the back of said fourth portion and couplingly receiving said first coupling claw, and a second coupling hole being formed on the bottom of said third portion and couplingly receiving said second coupling claw.

12. In a lens-fitted photographic film unit having an exposure aperture and a film supplying chamber for containing an unexposed photographic film and a film take-up chamber for winding up said film when exposed, said chambers being disposed on opposite lateral sides of said exposure aperture, and which includes a taking lens, a shutter mechanism, and a film wind-up mechanism for winding said exposed film; the improvement wherein said lens-fitted film unit comprises:

a film containing section having said exposure aperture, said film supplying chamber, said film take-up chamber and said film wind-up mechanism;

a rear cover arranged behind said film containing section;

a photo-taking device section having said shutter mechanism and supporting said taking lens;

a front cover arranged in front of said film containing section and coupled with said rear cover so as fixedly to hold said film containing section and said photo-taking device section between said two covers;

a flash circuit board of a flash device for causing a light-emitting section to emit light at the time of taking a photograph;

a pair of contacts provided on a surface of said flash circuit board;

a pair of elongated metal contact plates disposed side by side, supported on said photo-taking device section, one pair of ends of said respective contact plates serving for an X contact to be switched on/off in accordance with an operation of said shutter mechanism, an opposite pair of ends of said respective contact plate serving as terminals; and holding means for holding said flash circuit board in a state of keeping said contacts of said flash circuit board in contact with said terminals of said contact plates when said flash circuit board is removably inserted into said photo-taking device section.

13. A lens-fitted photographic film unit as defined in claim 12, wherein said light-emitting section is mounted on said flash circuit board.

14. A lens-fitted photographic film unit as defined in claim 12, wherein one of said contact plates is pressed by a portion of a shutter blade of said shutter mechanism into contact with the other contact plate when said shutter blade takes an open position.

15. A lens-fitted photographic film unit as defined in claim 12, wherein said contact plates are attached to a lens board for holding said taking lens.

16. A lens-fitted photographic film unit as defined in claim 12, said contacts of said flash circuit board are lands, and said terminals of said contact plates are bent to L-shape and inclined so as to be in resilient contact with said lands.

17. A lens-fitted photographic film unit as defined in claim 12, wherein said holding means includes a supporting plate for supporting said flash circuit board from behind; and a supporting member for supporting said flash circuit board supported on said flash circuit board from the front.

18. A lens-fitted photographic film unit as defined in claim 17, wherein said supporting plate and said supporting member are formed on the outside of said light-shielding tube arranged between said taking lens and said exposure aperture.

19. A lens-fitted photographic film unit as defined in claim 12, wherein said front cover further includes means for pressing said contact plates against said flash circuit board.

20. A lens-fitted photographic film unit as defined in claim 19, wherein said pressing means includes at least one projecting portion formed on said rear side of said front cover and projecting toward said flash circuit board; two grooves formed on said projecting portion for receiving said contact plates in order to keep said contact plates in contact with said flash circuit board; and inclined surfaces formed on said projecting portion for guiding said contact plates to be inserted in said grooves.

21. A lens-fitted photographic film unit comprising: 'a film-containing unit provided with a film wind-up mechanism and a rear cover attached to a film-containing section so as to shield the rear side of said film-containing section from light after unexposed photographic film has been loaded in said film-containing section;
a photo-taking device unit supporting a taking lens and having a shutter mechanism incorporated therein; and
a front cover arranged in front of said photo-taking device unit;
said front and rear covers being coupled to each other but not to said photo-taking device unit, thereby to permit reuse of said photo-taking device unit upon separation of said front and rear covers and removal of said exposed film.

22. A lens-fitted photographic film unit in which a taking lens, a shutter mechanism and a film wind-up mechanism are mounted on a film housing containing unexposed photographic film, comprising:
a lens holder for holding said taking lens;
a flash circuit board for a flash device; and
a pair of metal contact plates disposed side by side, supported on said lens holder, one end of each of said contact plates constituting an X contact which causes a synchro signal for allowing said flash device to emit light when said shutter mechanism brings said ends together into contact, opposite ends of said contact plates serving as terminals and extending toward said flash circuit board, and means whereby said terminals are pressed against contacts of said flash circuit board for electrical contact therewith when said flash circuit board is inserted in said film housing.

23. A lens-fitted photographic film unit as defined in claim 22, wherein said terminals of said contact plates are L-shaped and inclined so as to be in resilient contact with said contacts of said flash circuit board.

24. A lens-fitted photographic film unit as defined in claim 23, further comprising means for pressing said contact plates against said flash circuit board.

25. In a lens-fitted photographic film unit having an exposure aperture and a film supplying chamber for containing an unexposed photographic film and a film take-up chamber for winding up said film when exposed, said chambers being disposed on opposite lateral sides of said exposure aperture, and which includes a taking lens, a shutter mechanism, and a film wind-up mechanism for winding said exposed film; the improvement wherein said lens-fitted film unit comprises:
a film containing section having said exposure aperture, said film supplying chamber, said film take-up chamber and said film wind-up mechanism;
a photo-taking device section including a light-shielding tube for directing only light which has passed through said taking lens to said exposure aperture, on which section said shutter mechanism is mounted, said photo-taking device section being attached to a front of said film containing section;
a front cover arranged in front of said photo-taking section;
a rear cover arranged behind said film containing section and coupled with said front cover so as to shield a rear side of said film containing section from light after loading said unexposed film in said film containing section and arranged to contain said film containing section and said photo-taking device section within said two covers, whereby at least said photo-taking device section can be re-used;
there being a quadrilateral groove formed on said film containing section, a rear edge of said light-shielding tube of said photo-taking device section being fitted in said groove.

* * * * *